United States Patent
Kim et al.

(10) Patent No.: US 11,778,719 B2
(45) Date of Patent: Oct. 3, 2023

(54) LASER BEAM DELIVERY APPARATUS FOR EXTREME ULTRA VIOLET LIGHT SOURCE

(71) Applicant: Samsung Electronics Co., Ltd., Suwon-si (KR)

(72) Inventors: Dohyung Kim, Hwaseong-si (KR); Seongchul Hong, Suwon-si (KR); Kyungsik Kang, Bucheon-si (KR); Insung Kim, Seongnam-si (KR); Motoshi Sakai, Suwon-si (KR); Seulgi Lee, Cheongju-si (KR); Jungchul Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 579 days.

(21) Appl. No.: 16/927,050

(22) Filed: Jul. 13, 2020

(65) Prior Publication Data

US 2021/0219408 A1  Jul. 15, 2021

(30) Foreign Application Priority Data

Jan. 9, 2020  (KR) .................. 10-2020-0003166

(51) Int. Cl.
*H01S 3/23* (2006.01)
*H05G 2/00* (2006.01)
(Continued)

(52) U.S. Cl.
CPC ......... *H05G 2/008* (2013.01); *G02B 19/0047* (2013.01); *G02B 26/0816* (2013.01);
(Continued)

(58) Field of Classification Search
CPC .... H01S 3/0071; H01S 3/1003; H01S 3/2316; G02B 26/0816; G02B 19/0047; B23K 26/032; B23K 26/0643; B23K 26/0648
See application file for complete search history.

(56) References Cited

U.S. PATENT DOCUMENTS 8,395,133 B2   3/2013  Moriya et al.
8,604,452 B2  12/2013  Ershov
(Continued)

FOREIGN PATENT DOCUMENTS

| CN | 103235413 B | * | 5/2015 | |
| CN | 110459950 A | * | 11/2019 | |
| JP | 4281397 B2 | * | 6/2009 | ............. C03B 11/08 |

OTHER PUBLICATIONS

Faiz Rahman, Optics & Photonics, 'EUV Light Sources for Next-Gen Lithography' *Optics & Photonics News*, Mar. 1, 2018, retrieved at <https://www.osa-opn.org/opn/media/Images/PDF/2018/0318/42-49_OPN_03_18.pdf?ext=.pdf>.

(Continued)

*Primary Examiner* — David E Smith
*Assistant Examiner* — Hsien C Tsai
(74) *Attorney, Agent, or Firm* — Harness, Dickey & Pierce, P.L.C.

(57) ABSTRACT

A laser beam delivery apparatus of an extreme ultra violet light source may include a high power seed module configured to generate a laser beam, a power amplifier configured to amplify the laser beam generated by the high power seed module, a beam transfer module configured to collect and move the laser beam amplified by the power amplifier, a final focusing assembly optical platform configured to adjust focus of the laser beam collected and moved by the beam transfer module, and a focusing unit configured to focus the laser beam with the focus adjusted by the final focusing assembly optical platform to a target droplet. The power amplifier may include a position adjuster configured to adjust a position of the laser beam. The position adjuster may include a refraction plate having a flat surface. The power amplifier may include a pointing adjuster, which may include a mirror.

20 Claims, 13 Drawing Sheets

(51) Int. Cl.
 *G02B 26/08* (2006.01)
 *H01S 3/00* (2006.01)
 *G02B 19/00* (2006.01)

(52) U.S. Cl.
 CPC ........ *G02B 26/0875* (2013.01); *H01S 3/0071* (2013.01); *H01S 3/2316* (2013.01)

(56) References Cited

U.S. PATENT DOCUMENTS

| | | |
|---|---|---|
| 8,817,232 B2 | 8/2014 | Buis et al. |
| 9,444,214 B2 | 9/2016 | Dinger |
| 2010/0045956 A1 | 2/2010 | Van De Kerkhof et al. |
| 2010/0110535 A1* | 5/2010 | Murison ............ H01S 3/06716 385/124 |
| 2011/0211601 A1 | 9/2011 | Ariga et al. |
| 2014/0071520 A1* | 3/2014 | Armstrong ............ H01S 3/2316 359/334 |
| 2019/0171116 A1 | 6/2019 | Van Der Laan et al. |
| 2020/0004159 A1* | 1/2020 | Yeh ........................ H05G 2/008 |

OTHER PUBLICATIONS

TRUMPF, TRUMPF Laser Amplifier, retrieved at https://web.archive.org/web/20200429103452/https://www.trumpf.com/en_US/products/laser/euv-drive-laser/ (available Apr. 29, 2020).

Johannes Kaschke, Beam Quality of Pulsed High Power CO2-Lasers, EUV Litho 2018 Source Workshop, Jun. 11, 2018, retrieved at https://www.euvlitho.com/2018/S36.pdf <https://.euvlitho./2018/S36.pdf>.

* cited by examiner

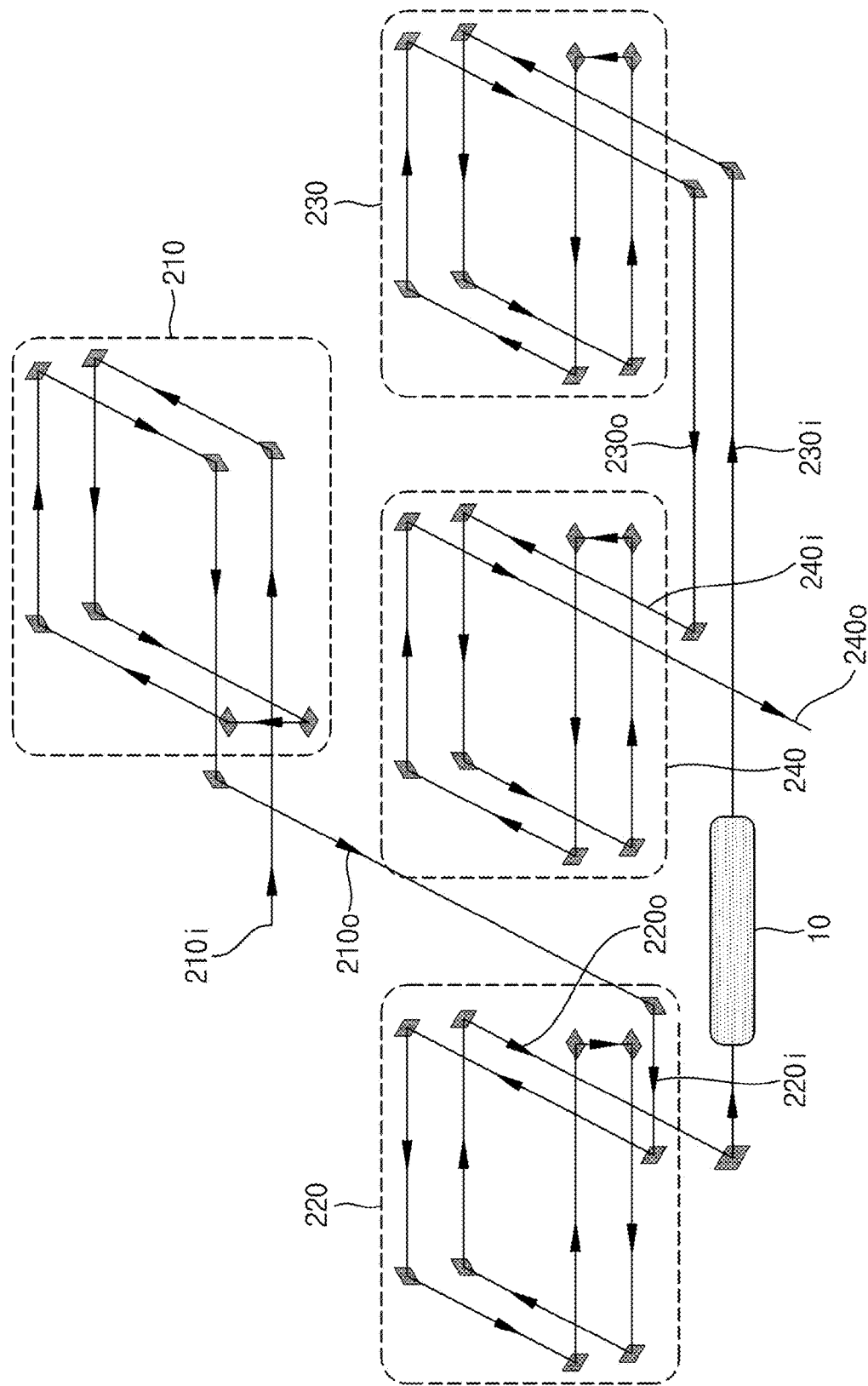

LASER BEAM DELIVERY APPARATUS FOR EXTREME ULTRA VIOLET LIGHT SOURCE

CROSS-REFERENCE TO THE RELATED APPLICATION

This application claims the benefit of Korean Patent Application No. 10-2020-0003166, filed on Jan. 9, 2020, in the Korean Intellectual Property Office, incorporated by reference herein in its entirety.

BACKGROUND

1. Field

Apparatuses and methods consistent with inventive concepts relate to a laser beam delivery apparatus of an extreme ultra violet light source for removing cross-talk between position adjustment and pointing adjustment by replacing a position adjuster of a laser beam with a plurality of refraction plates.

2. Description of the Related Art

A light source used in an extreme ultra violet (EUV) scanner has used a method of acquiring a EUV light source from plasma generated by focusing high power $CO_2$ laser beams to droplets. During this procedure, the laser beams may be required to be precisely aligned and maintained for the stability of the light source. In the case of a conventional system, laser beams are controlled through (and/or using) two driving mirrors for respectively adjusting a position and positioning, but in this method, cross-talk between position and pointing adjustment inevitably occurs. Accordingly, there is a need for a laser beam delivery apparatus for ensuring the stability of transmission of laser beams by removing cross-talk between position and pointing adjustment of laser beams.

SUMMARY

Example embodiments of the disclosure provide a laser beam delivery apparatus of an extreme ultra violet light source for removing cross-talk between position adjustment and pointing adjustment by replacing a position adjuster of a laser beam with a plurality of refraction plates.

In accordance with an embodiment of the disclosure, a laser beam delivery apparatus may include a high power seed module configured to generate a laser beam, a power amplifier configured to amplify the laser beam generated by the high power seed module, a beam transfer module configured to collect and move the laser beam amplified by the power amplifier, a final focusing assembly optical platform configured to adjust focus of the laser beam collected and moved by the beam transfer module, and a focusing unit configured to focus the laser beam with the focus adjusted by the final focusing assembly optical platform to a target droplet. The power amplifier may include a position adjuster configured to adjust a position of the laser beam. The position adjuster may include a refraction plate.

In accordance with an embodiment of the disclosure, a laser beam delivery apparatus may include a high power seed module configured to generate a laser beam, a power amplifier configured to amplify the laser beam generated by the high power seed module, a beam transfer module configured to collect and move the laser beam amplified by the power amplifier, a final focusing assembly optical platform configured to adjust focus of the laser beam collected and moved by the beam transfer module, and a focusing unit configured to focus the laser beam with the focus adjusted by the final focusing assembly optical platform to a target droplet. The beam transfer module may include a position adjuster configured to adjust a position of a laser beam. The position adjuster may include a refraction plate.

In accordance with an embodiment of the disclosure, a laser beam delivery apparatus may include a high power seed module configured to generate a laser beam, a power amplifier configured to amplify the laser beam generated by the high power seed module, a beam transfer module configured to collect and move the laser beam amplified by the power amplifier, a final focusing assembly optical platform configured to adjust focus of the laser beam collected and moved by the beam transfer module, and a focusing unit configured to focus the laser beam with the focus adjusted by the final focusing assembly optical platform to a target droplet. The final focusing assembly optical platform may include a position adjuster configured to adjust a position of the laser beam, and a pointing adjuster configured to adjust a pointing angle of the laser beam. The position adjuster may include a refraction plate. The pointing adjuster may include a mirror.

BRIEF DESCRIPTION OF THE DRAWINGS

FIGS. 2A to 2C and 3A to 3C are diagrams showing the power amplifier (PA) according to various embodiments of the disclosure.

DETAILED DESCRIPTION OF EXAMPLE EMBODIMENTS

Figure 1:
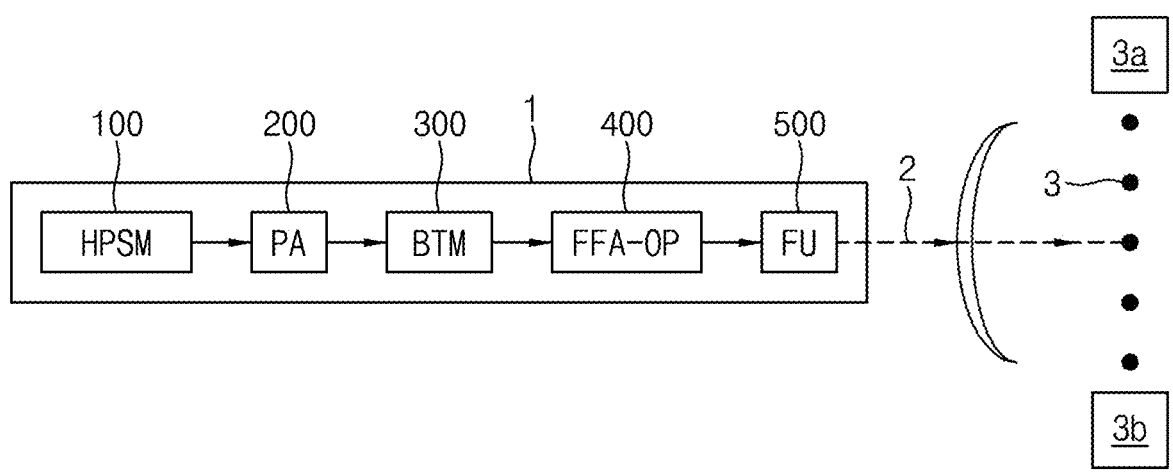
FIG. 1 is a diagram showing a laser beam delivery apparatus according to an embodiment of the disclosure.

FIG. 1 is a diagram showing a laser beam delivery apparatus 1 according to an embodiment of the disclosure. Referring to FIG. 1, a laser beam 2 emitted from the laser beam delivery apparatus 1 may be irradiated onto droplets 3. The laser beam 2 may include a high power $CO_2$ laser beam. The droplets 3 may be supplied from a droplet supplier 3a disposed above, may be irradiated with the laser beam 2, and may then be collected by a droplet collector 3b disposed below. The droplets 3 may include a tin (Sn) droplet. The droplets 3 may be supplied with 50 kHz.

The laser beam delivery apparatus 1 of an extreme ultra violet light source uses a laser produced plasma (LPP) method of generating plasma by focusing the laser beam 2 of high power to the droplets 3 that move at high speed and acquiring an extreme ultra violet (EUV) from the generated plasma. The LPP method inevitably has a long beam delivery path due to a structure such as Fab. An optical system is more sensitive to alignment of light as a path is further increased, and thus, there is a more increasing need to continuously check whether beams are appropriately aligned and to compensate for beam alignment as the beam delivery path is further increased.

Referring to FIG. 1, the laser beam delivery apparatus 1 may include a high power seed module (HPSM) 100, a power amplifier (PA) 200, a beam transfer module (BTM) 300, a final focusing assembly optical platform (FFA-OP) 400, and a focusing unit 500. The laser beam 2 may be sequentially transmitted and emitted through (and/or using) the HPSM 100, the power amplifier (PA) 200, the BTM 300, the FFA-OP 400, and the focusing unit (FU) 500. Examples of the high power seed module (HPSM) 100, power amplifier (PA) 200, beam transfer module (BTM) 300, and final focusing assembly optical platform (FFA-OP) 400 are described below so a duplicate description is omitted here for brevity.

The high power seed module (HPSM) 100 may generate a laser beam including pre-pulse (PP) and main-pulse (MP). The laser beam generated by the HPSM 100 may be provided to the power amplifier (PA) 200. The high power seed module (HPSM) 100 may include components such as seed lasers and a power supply circuit for generating the laser beam using the pre-pulse (PP) and main-pulse (MP). However, example embodiments are not limited thereto.

FIGS. 2A to 2C and 3A to 3C are diagrams showing the power amplifier (PA) 200 according to various embodiments of the disclosure.

Figure 2A:
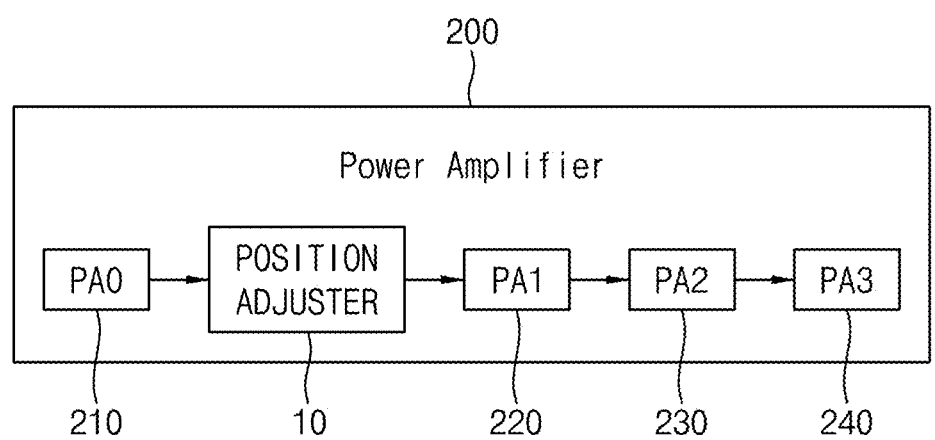
Figure 2B:
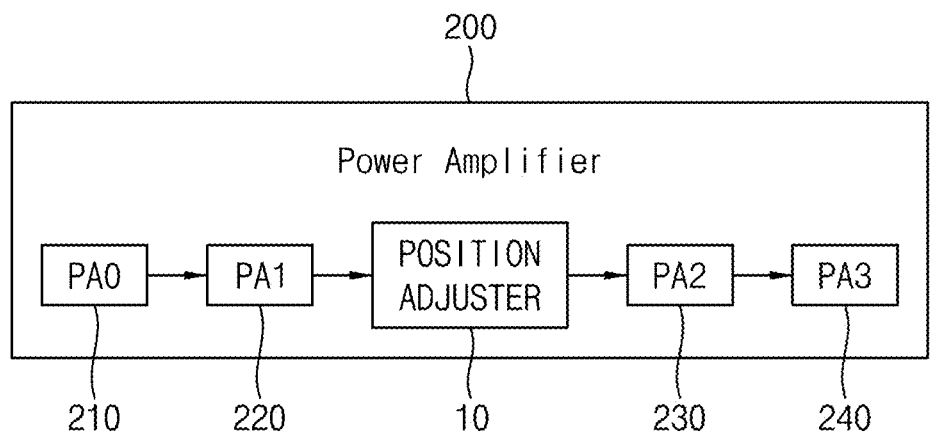
Figure 2C:
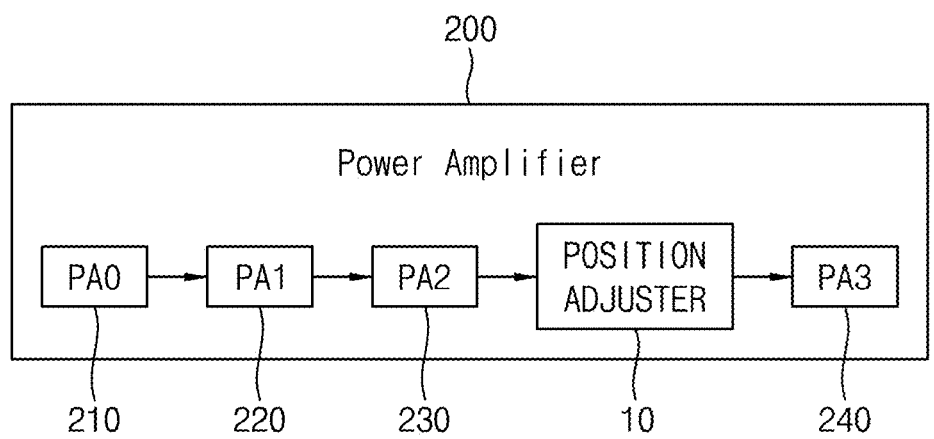

The power amplifier (PA) 200 may amplify output of the laser beam generated by the HPSM 100. Referring to FIGS. 2A to 2C, the power amplifier (PA) 200 may include a first power amplifier (PA0) 210, a second power amplifier (PA1) 220, a third power amplifier (PA2) 230, and a fourth amplifier (PA3) 240. The first to fourth amplifiers PA0 to PA3 may include power supply circuits and may be connected by optics, but are not limited thereto. In the laser beam delivery apparatus 1, the four amplifiers 210, 220, 230, and 240 may be connected in series to each other and may amplify the laser beam 2. The first power amplifier (PA0) 210 may amplify the laser beam generated by the HPSM 100. The second power amplifier (PA1) 220 may amplify the laser beam amplified by the first power amplifier (PA0) 210. The third power amplifier (PA2) 230 may amplify the laser beam amplified by the second power amplifier (PA1) 220. The fourth amplifier (PA3) 240 may amplify the laser beam amplified by the third power amplifier (PA2) 230. According to an embodiment, the power amplifier (PA) 200 may include a position adjuster 10. The position adjuster may include a refraction plate.

In FIG. 1, the laser beam 2 focused to the droplets 3 may have two elements of position and pointing. The position of the laser beam 2 may be a position of the droplets 3 with which the laser beam 2 collides and the pointing may be an angle at which the laser beam 2 collides with the droplets 3. In the LPP method, the laser beam delivery apparatus 1 of the extreme ultra violet light source may continuously check whether the laser beam 2 is appropriately focused to the droplets 3 and may compensate for the result by adjusting the position and the pointing. The position adjuster 10 may adjust the position of the laser beam 2 and a pointing adjuster 20 may adjust the pointing of the laser beam 2.

When both position adjustment and pointing adjustment of the laser beam 2 are performed by a rotatably driven mirror, both position and pointing may be adjusted, but during this procedure, cross-talk between two mirrors inevitably occurs. For example, when the position adjuster including mirrors is rotatably driven, a pointing angle of a laser beam may also be affected, and thus, the pointing adjuster needs to be also rotatably driven in order to adjust the pointing of the laser beam again. When the position is adjusted via parallel displacement of a mirror, it is difficult to move the mirror in parallel to a path of the laser beam, and thus, laser beams may be misaligned. According to an embodiment of the disclosure, the position adjuster 10 may include a rotatably driven refraction plate instead of a rotatably driven mirror. The pointing adjuster 20 may include a rotatably driven mirror.

Figure 3A:
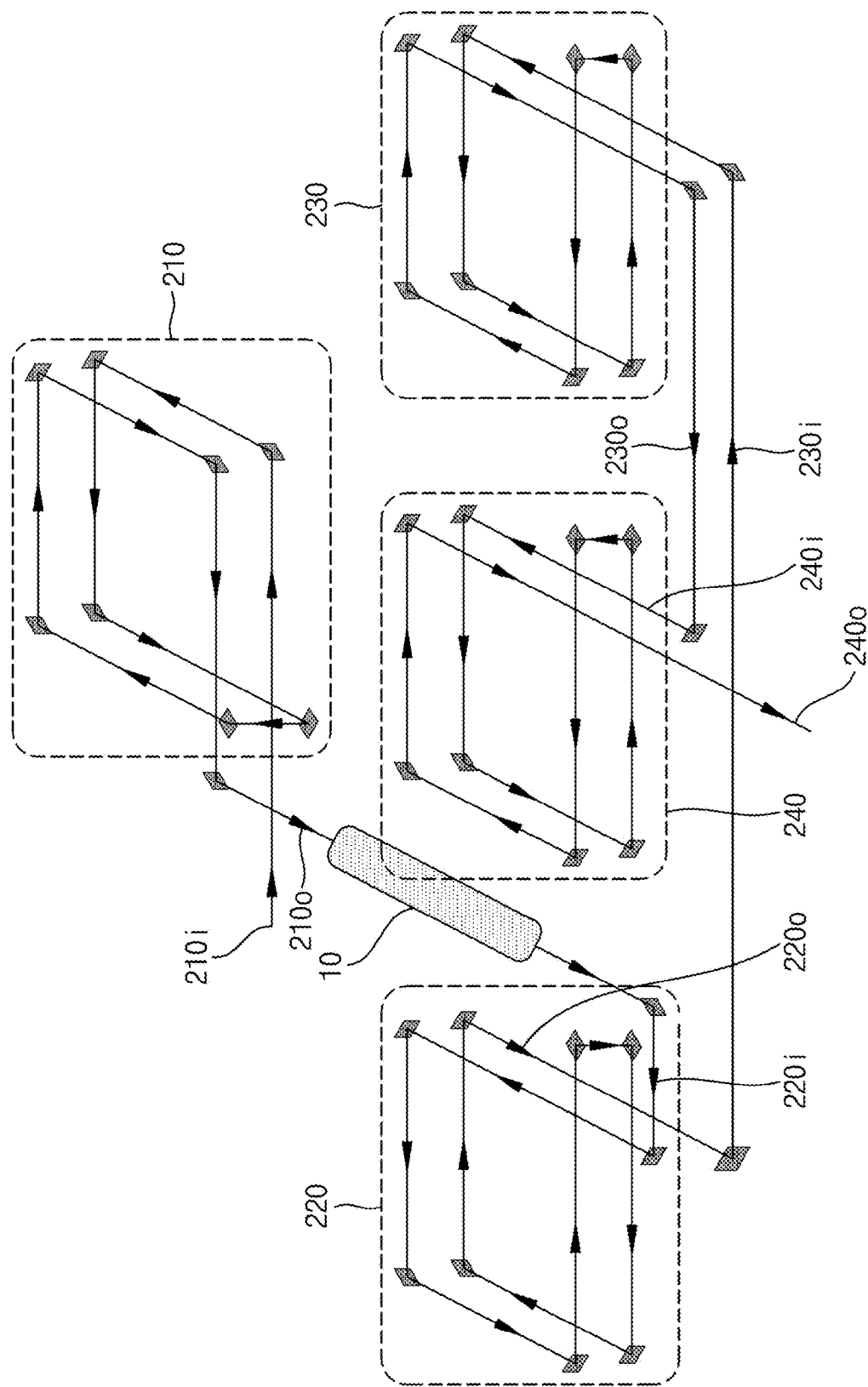

Referring to FIGS. 2A and 3A, the position adjuster 10 may be disposed between the first power amplifier (PA0) 210 and the second power amplifier (PA1) 220. Power of the laser beam 2 that is output from the first power amplifier (PA0) 210 (210o) and is directed toward the second power amplifier (PA1) 220 may be about 1 kW. Referring to FIG. 3A, the laser beam 2 may be input to the first power amplifier (PA0) 210 (210i) and may be amplified and output by the first power amplifier (PA0) 210 (210o). The position of the laser beam 2 may be adjusted by the position adjuster 10. The laser beam 2 with the adjusted position may be input to the second power amplifier (PA1) 220 (220i), may be amplified and output by the second power amplifier (PA1) 220 (220o), input to the third power amplifier (PA2) 230 (230i), amplified and output by the third power amplifier (PA2) 230 (230o), input to the fourth amplifier (PA3) 240 (240i), and amplified and output by the fourth amplifier (PA3) 240 (240o). The laser beam that is output from the fourth amplifier (PA3) 240 (240o) may be input to the BTM 300.

Referring to FIGS. 2B and 3B, the position adjuster 10 may be disposed between the second power amplifier (PA1) 220 and the third power amplifier (PA2) 230. Power of the laser beam 2 that is output from the second power amplifier (PA1) 220 (220o) and is directed toward the third power amplifier (PA2) 230 may be about 4 kW. Referring to FIG. 3B, the laser beam 2 may be input to the first power amplifier (PA0) 210 (210i) and may be amplified and output by the first power amplifier (PA0) 210 (210o), may be input to the second power amplifier (PA1) 220 (220i), and may be amplified and output by the second power amplifier (PA1) 220 (220o), the position of the laser beam 2 may be adjusted by the position adjuster 10, and the laser beam 2 with the adjusted position may be input to the third power amplifier (PA2) 230 (230i), may be amplified and output by the third power amplifier (PA2) 230 (230o), may be input to the fourth amplifier (PA3) 240 (240i), and may be amplified and output by the fourth amplifier (PA3) 240 (240o). The laser beam that is output from the fourth amplifier (PA3) 240 (240o) may be input to the BTM 300.

Figure 3C:
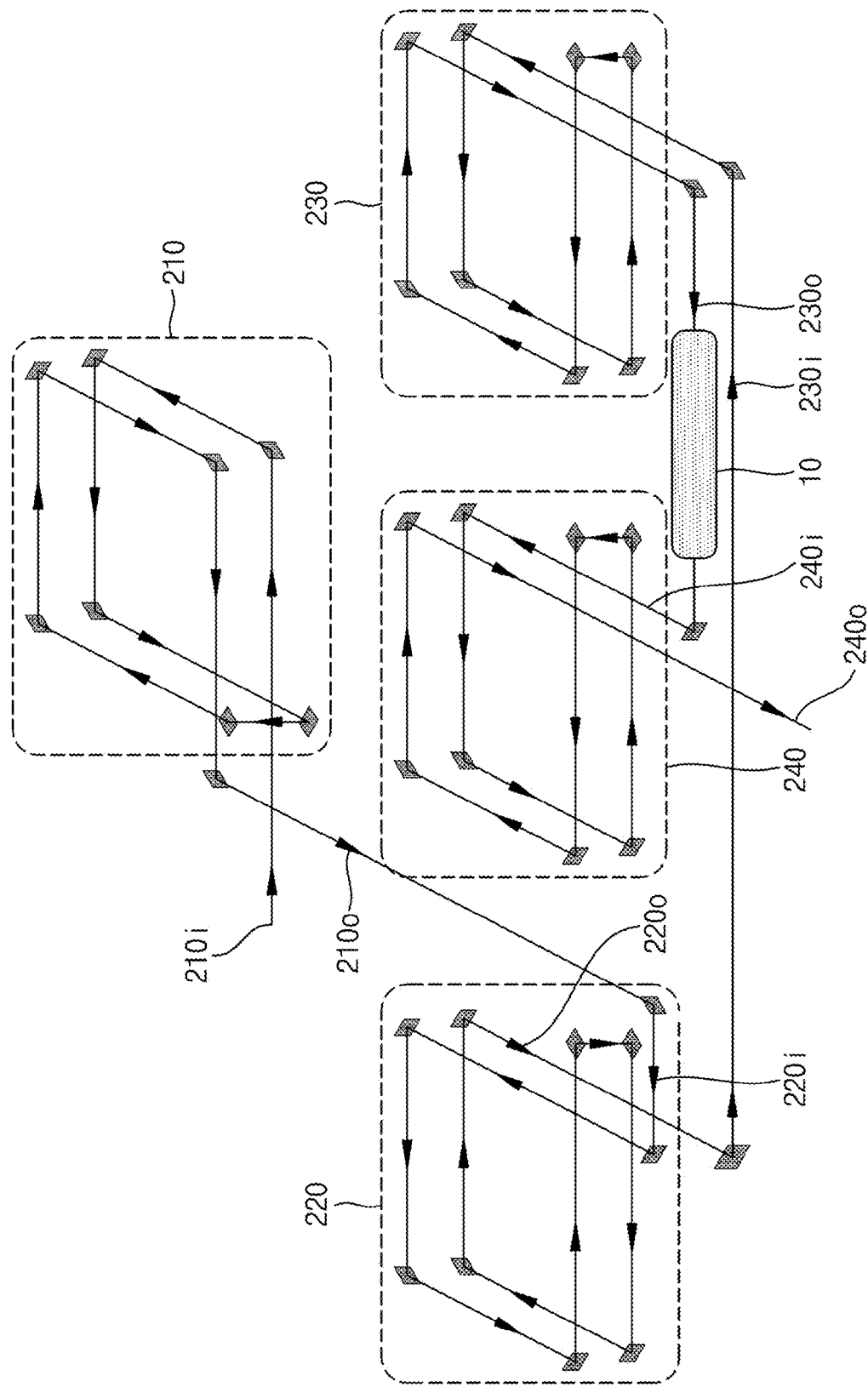

Referring to FIGS. 2C and 3C, the position adjuster 10 may be disposed between the third power amplifier (PA2) 230 and the fourth power amplifier (PA3) 240. Referring to FIG. 3C, the laser beam 2 may be input to the first power amplifier (PA0) 210 (210i), may be amplified and output by the first power amplifier (PA0) 210 (210o), may be input to the second power amplifier (PA1) 220 (220i), may be amplified and output by the second power amplifier (PA1) 220 (220o), may be input to the third power amplifier (PA2) 230 (230i), and may be amplified and output by the third power amplifier (PA2) 230 (230o), the position of the laser beam 2 may be adjusted by the position adjuster 10, and the laser beam 2 with the adjusted position may be input to the fourth amplifier (PA3) 240 (240i) and may be amplified and output by the fourth amplifier (PA3) 240 (240o). The laser beam output by the fourth amplifier (PA3) 240 (240o) may be input to the BTM 300. Power of the laser beam that is output by the fourth amplifier (PA3) 240 (240o) may be about 40 kW.

Figure 4A:
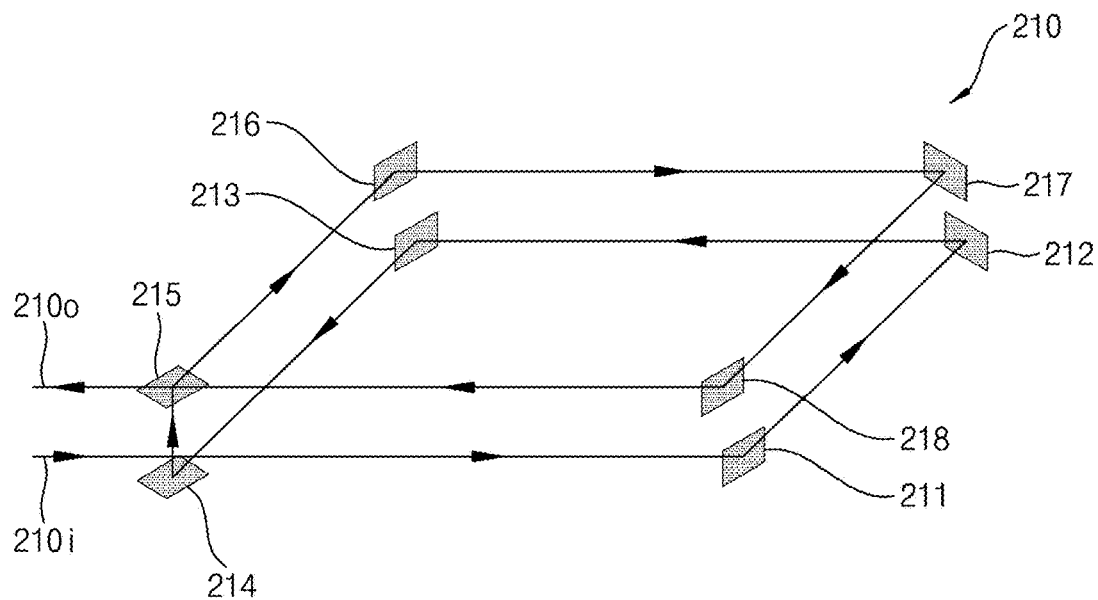
FIGS. 4A to 4C are diagrams for explaining the amplifiers according to an embodiment of the disclosure.
Figure 4B:
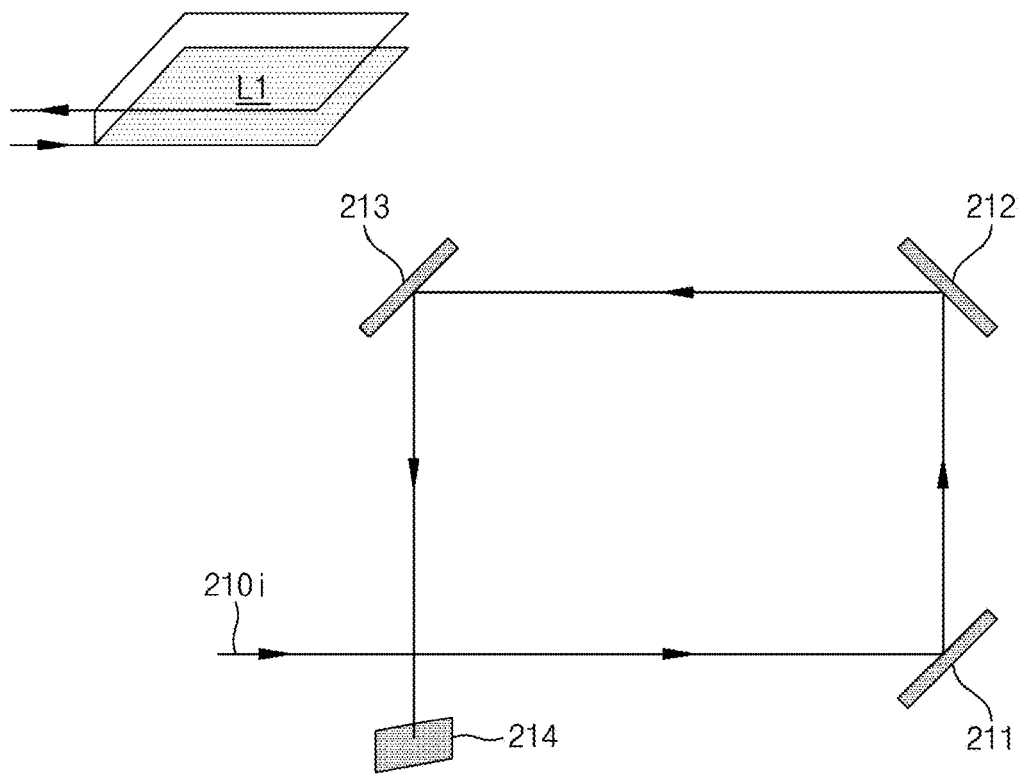
Figure 4C:
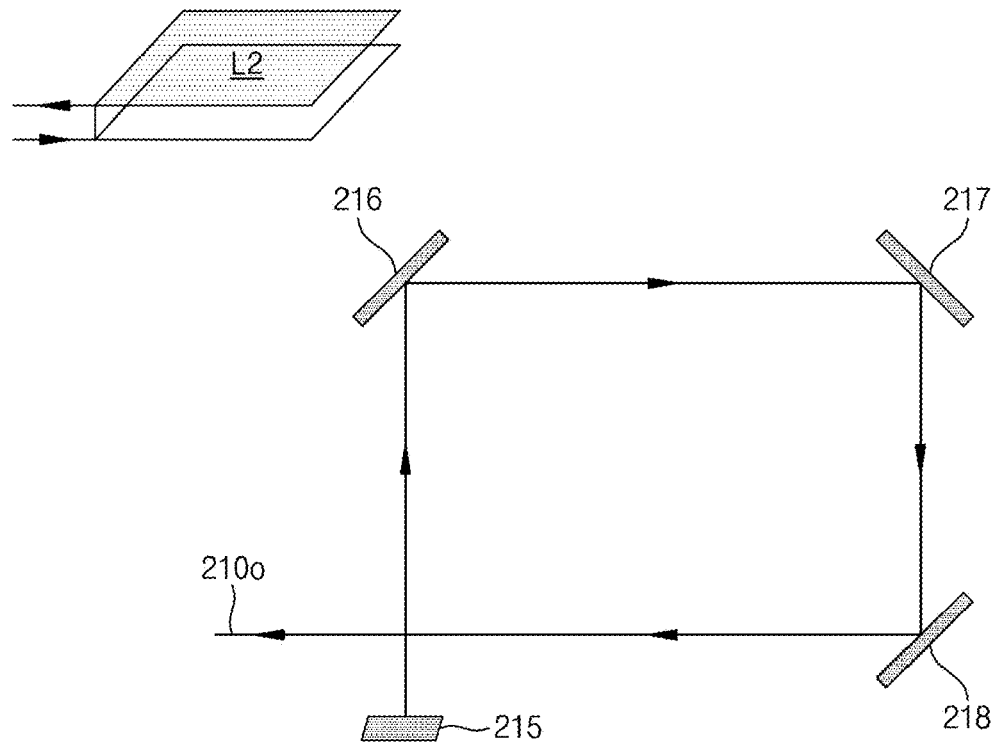

FIGS. 4A to 4C are diagrams for explaining the amplifiers 210, 220, 230, and 240 according to an embodiment of the disclosure. The first power amplifier (PA0) 210, the second power amplifier (PA1) 220, the third power amplifier (PA2) 230, and the fourth amplifier (PA3) 240 may include a first layer L1 including a first amplification mirror 211, a second amplification mirror 212, a third amplification mirror 213, and a fourth amplification mirror 214, and a second layer L2 including a fifth amplification mirror 215, a sixth amplification mirror 216, a seventh amplification mirror 217, and an eighth amplification mirror 218.

Referring to FIGS. 4A to 4C, each of the amplifiers 210, 220, 230, and 240 may include eight mirrors. For example, a laser beam in the first power amplifier (PA0) 210 may be input to the first amplification mirror 211 of the first layer L1 (210i), may be sequentially transmitted through (and/or using) the second amplification mirror 212, the third amplification mirror 213, and the fourth amplification mirror 214, and may be transmitted to the fifth amplification mirror 215 of the second layer L2. Then, the laser beam may be output by the first power amplifier (PA0) 210 (210o) through (and/or using) the sixth amplification mirror 216, the seventh amplification mirror 217, and the eighth amplification mirror 218.

Figure 5A:
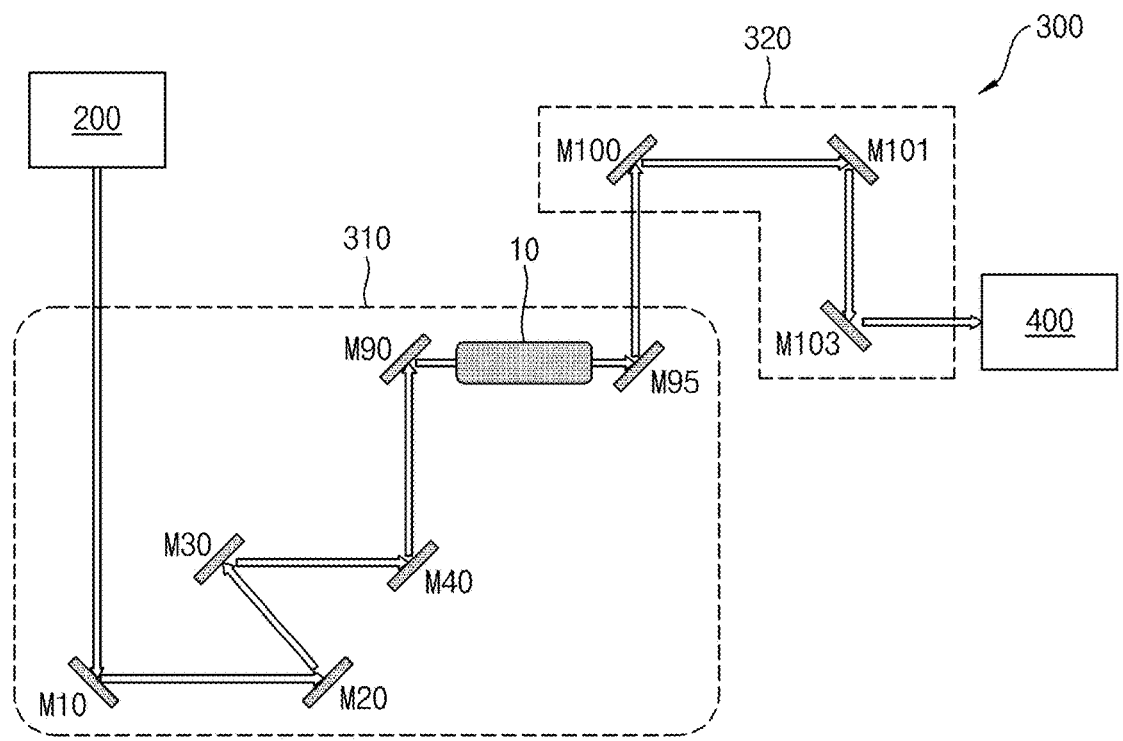
FIGS. 5A and 5B are diagrams showing the beam transfer module (BTM) according to various embodiments of the disclosure.
Figure 5B:
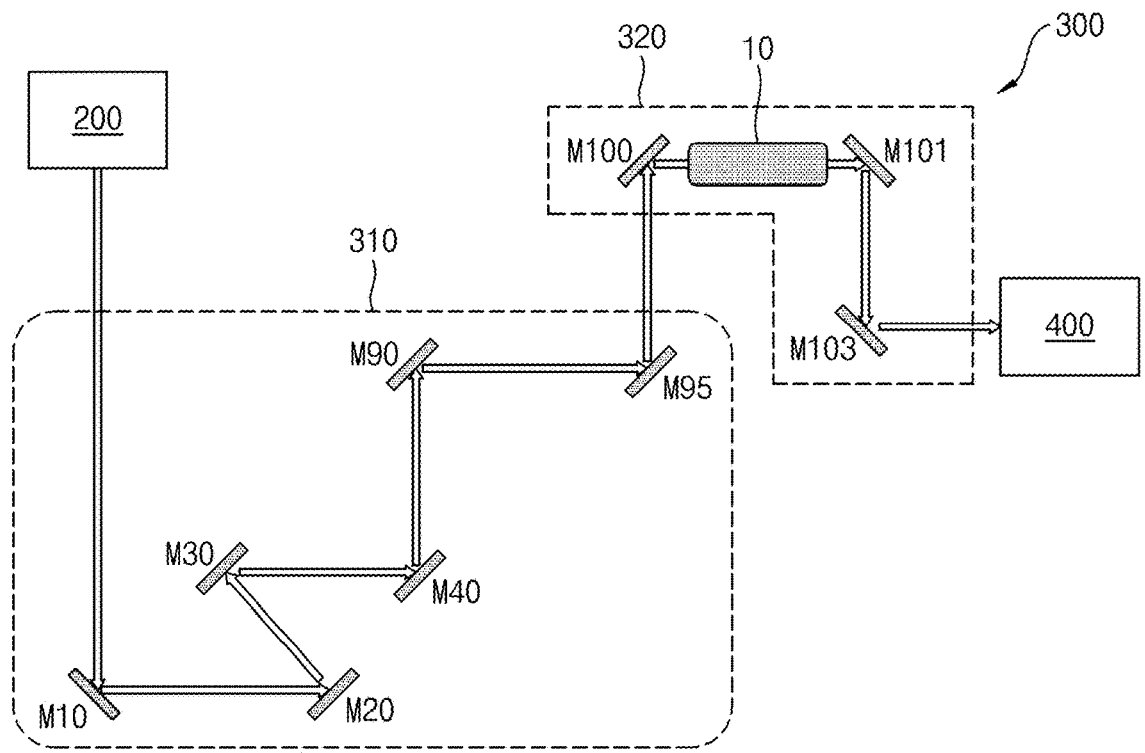

FIGS. 5A and 5B are diagrams showing the BTM 300 according to various embodiments of the disclosure. Referring to FIGS. 5A and 5B, the BTM 300 may include a pre-beam transfer module 310 and a main beam transfer module 320.

The BTM 300 may collect the laser beam 2 and may move the laser beam 2 in a direction toward the droplets 3. The laser beam input to the BTM 300 may be amplified to power of about 40 kW through (and/or using) the power amplifier (PA) 200 and may have high energy. Thus, the mechanical stability of a module with respect to high output load and air tightness such as low absorptance of the BTM 300 may be important. For low absorptance of a laser beam, a mirror included in the BTM 300 may be specially coated.

Referring to FIGS. 5A and 5B, the BTM 300 may include an assembly board, a periscope, and a plurality of mirrors M10, M20, M30, M40, M90, M95, M100, M101, and M103. The plurality of mirrors M10, M20, M30, M40, M90, M95, M100, M101, and M103 may collect the laser beam 2 and may move the laser beam 2 in a direction toward the droplets 3. According to an embodiment, the mirror M20 may include a paraboloid with a focal length f of −260. The mirror M30 may include a paraboloid with a focal length f of 600. Mirrors including a paraboloid may collect the laser beam 2.

When the position of a laser beam is adjusted by a driving mirror, the driving mirror may be included in the mirror M90. According to an embodiment of the disclosure, the position of a laser beam is adjusted by the position adjuster 10 including a refraction plate, and thus, the mirror M90 may be fixed rather than being driven.

Referring to FIG. 5A, the BTM 300 may include the pre-beam transfer module 310 for collecting a laser beam and the main beam transfer module 320 for moving the laser beam collected by the pre-beam transfer module 310. According to an embodiment, the pre-beam transfer module 310 may include the position adjuster 10. The position adjuster 10 may be disposed between the mirrors M90 and M95 of the pre-beam transfer module 310. That is, the laser beam that is output by the power amplifier (PA) 200 and is input to the pre-beam transfer module 310 may be collected by the mirrors M10, M20, M30, M40, and M90, and then, the position of the laser beam may be adjusted by the position adjuster 10. Then, the laser beam with the adjusted position may be reflected by the mirror M95 and may be provided to the main beam transfer module 320.

Referring to FIG. 5B, according to an embodiment, the main beam transfer module 320 may include the position adjuster 10. The position adjuster 10 may be disposed between the mirrors M100 and M101 of the main beam transfer module 320. That is, a laser beam output from the power amplifier (PA) 200 may be collected and transmitted through (and/or using) the mirrors M10, M20, M30, M40, M90, and M95 inside the pre-beam transfer module 310 and may then be input to the main beam transfer module 320. The laser beam input to the main beam transfer module 320 may be transmitted through (and/or using) the mirror M100 and the position of the laser beam may be adjusted by the position adjuster 10. Then, the laser beam with the adjusted position may be sequentially transmitted through (and/or using) the mirrors M101 and M103 and may be provided to the FFA-OP 400.

Figure 6:
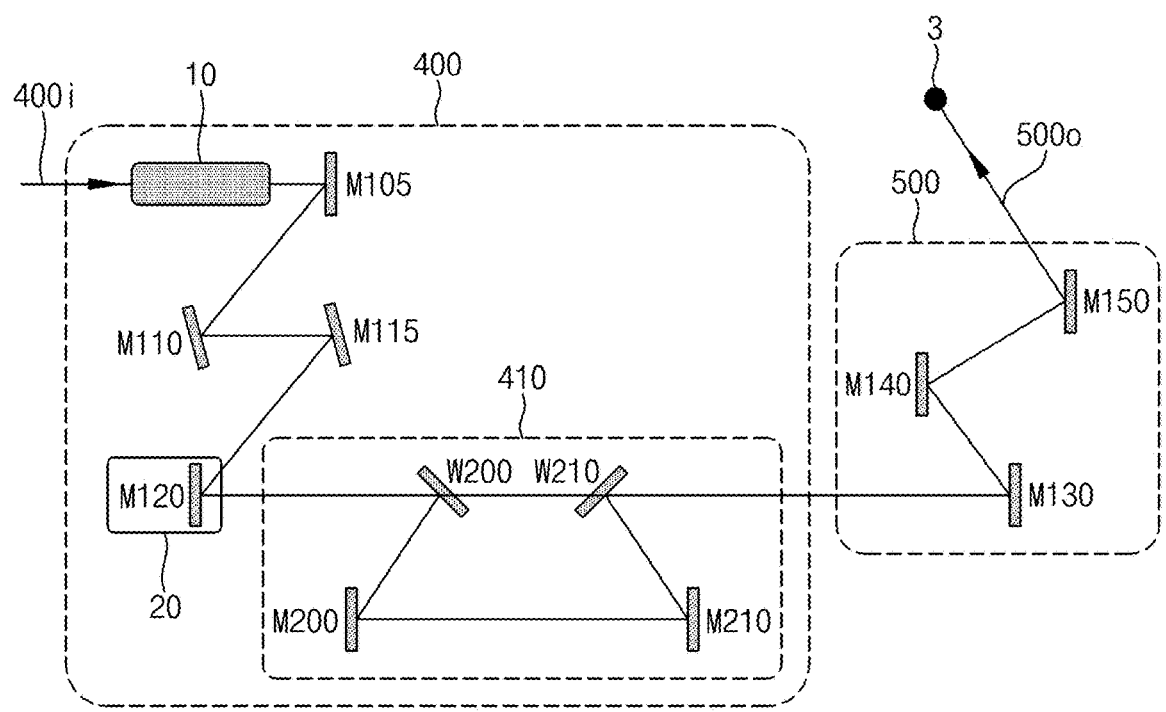
FIG. 6 is a diagram showing the final focusing assembly optical platform (FFA-OP) and the focusing unit (FU) according to an embodiment of the disclosure.

FIG. 6 is a diagram showing the final focusing assembly optical platform (FFA-OP) 400 and the focusing unit (FU) 500 according to an embodiment of the disclosure.

The FFA-OP 400 and the FU 500 may focus the laser beam 2 to the droplets 3. In order to form ideal plasma flash, the laser beam 2 needs to be accurately matched with the droplets 3. However, the size of the droplets 3 is smaller than the diameter of the laser beam 2, and thus, pre-pulse (PP) and main-pulse (MP) may be first separated by a PPB box 410. The PP may be a pulse with low power, may collide with the droplets 3 to expand particles of the droplets 3 in a disk shape, and may increase an area thereof. Then, the MP may be absorbed into a liquid membrane to generate original plasma for creating EUV laser beams. In this manner, output of 40 kW may be effectively used, and reliable preparation of plasma flash for light exposure may be ensured. The FU 500 may provide optimum focusing of the laser beam 2 with respect to the droplets 3.

Referring to FIG. 6, the focus adjustment module 400 may include the position adjuster 10, mirrors M105, M110, M115, and M120, and the PPB box 410. The position adjuster 10 may include a refraction plate. The mirrors M105, M110, M115, and M120 may reflect and transmit a laser beam. The PPB box 410 may include mirrors M200 and M210 and separation membranes W200 and W210 that separate MP and PP in the PPB box 410. According to an embodiment, position of a laser beam input to the focus adjustment module 400 (400i) may be adjusted by the position adjuster 10, the laser beam may be transmitted through (and/or using) the mirrors M105, M110, M115, and M120, MP and PP may be separated in the PPB box 410, and the laser beam may be input to the FU 500 in a state in which MP and PP are separated.

The focus adjustment module 400 may include the pointing adjuster 20. The pointing adjuster 20 may include a rotatably driven mirror. The pointing adjuster 20 may rotate a mirror and may adjust a pointing angle of the laser beam after and before the laser beam is reflected. The pointing adjuster 20 may be included in the mirror M120 of the focus adjustment module 400.

The FU 500 may include mirrors M130, M140, and M150. The FU 500 may focus a laser beam through (and/or using) the mirrors M130, M140, and M150. The focused laser beam 2 may be output from the FU 500 (500o) and may be focused to the droplets 3.

Referring to FIGS. 3A to 3C, 5A, 5B, and 6, the position adjuster 10 may be included in the power amplifier (PA) 200, the BTM 300, or the focus adjustment module 400. The position of the laser beam may be adjusted at any position, and according to an embodiment, the position adjuster 10 may also be repeatedly configured at two or more positions.

The laser beam 2 may have power that is strengthened to about 40 kW through (and/or using) the power amplifier (PA) 200. Thus, the power amplifier (PA) 200 having the laser beam 2 with power less than 5 kW may include the position adjuster 10. When the position adjuster 10 is included in the power amplifier (PA) 200, danger of damage of components inside the position adjuster 10 with respect to high power may be reduced.

When the position adjuster 10 is included in the power amplifier (PA) 200, power of a laser beam before the power amplifier (PA) 200 is lower than power of a laser beam behind the power amplifier (PA) 200, and thus, optical loss due to the position adjuster 10 may also be low. When optical loss occurs while a laser beam is transmitted through (and/or using) the position adjuster 10 included in the power amplifier (PA) 200, an amplification factor of one or more amplifiers 220, 230, and 240 positioned behind the position adjuster 10 on a path of the laser beam may be enhanced to compensate for the optical loss.

FIGS. 7A, 7B, 8, 9A, 9B, 10A, 10B, 11, and 12 are diagrams for explaining the position adjuster 10 according to various embodiments of the disclosure.

The position adjuster 10 may include a transmissive refraction plate having a smooth and flat surface to which a laser beam is input and a smooth and flat surface from which the laser beam is output. The refraction plate may include a quartz glass.

Figure 7A:
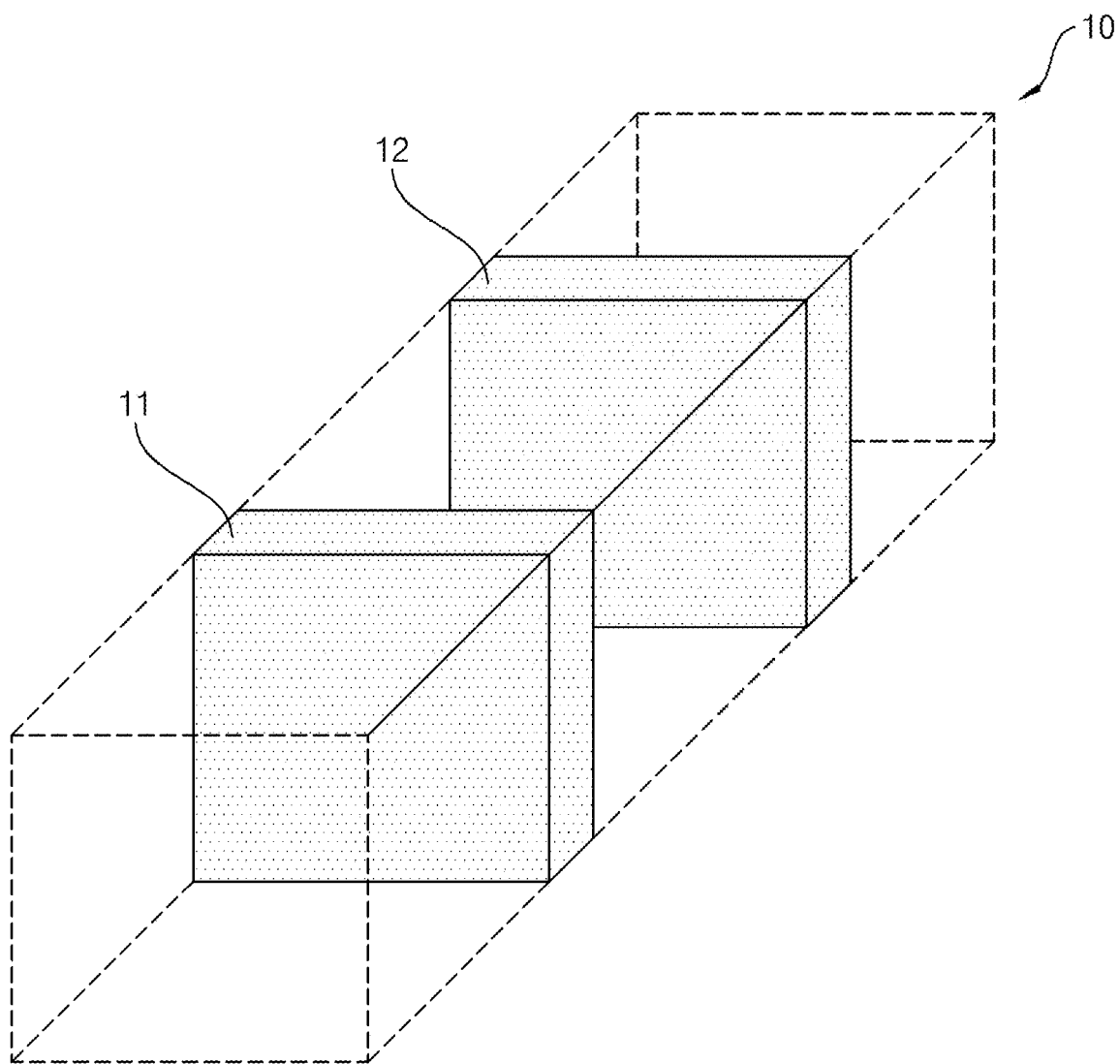
FIGS. 7A, 7B, 8, 9A, 9B, 10A, 10B, 11, and 12 are diagrams for explaining the position adjuster according to various embodiments of the disclosure.

Referring to FIG. 7A, the refraction plate may include a first refraction plate 11 and a second refraction plate 12 that are sequentially disposed on a path of the laser beam 2. The first refraction plate 11 and the second refraction plate 12 may each include a quartz glass.

Figure 7B:
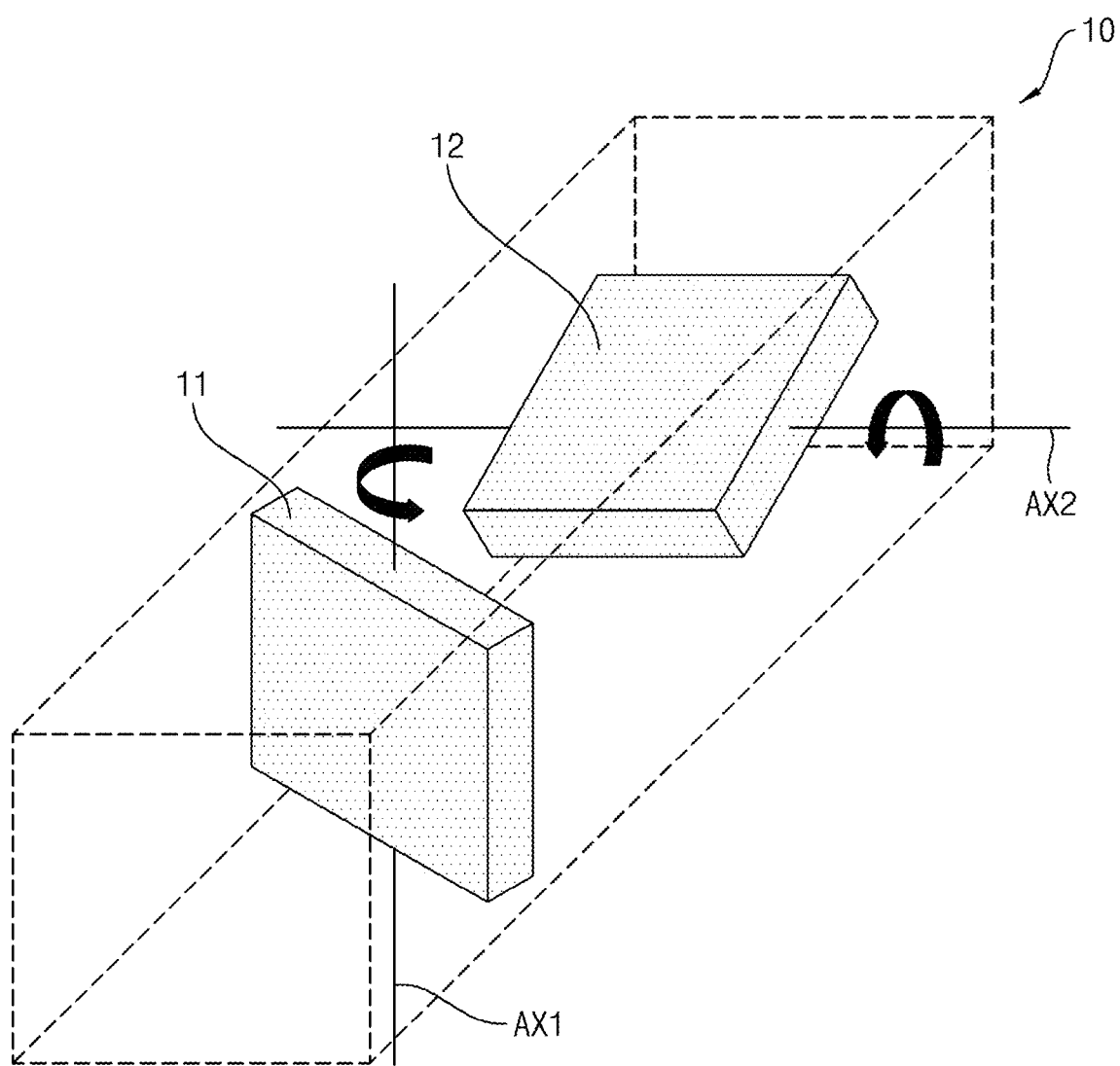

Referring to FIG. 7B, the first refraction plate 11 may revolve around a first adjustment axis AX1 and the second refraction plate 12 may revolve around a second adjustment axis AX2. According to an embodiment, the first adjustment axis AX1 and the second adjustment axis AX2 may be orthogonal to each other.

Figure 8:
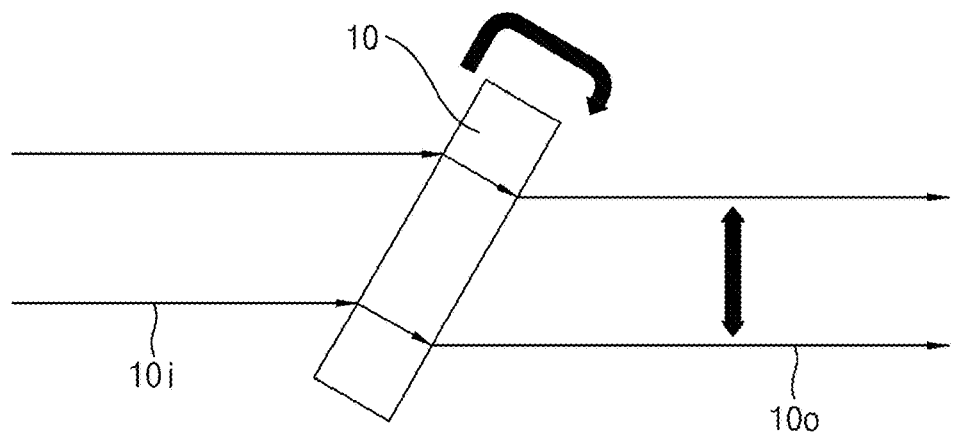

Referring to FIG. 8, the position adjuster 10 may include a refraction plate having opposite flat surfaces. A laser beam 10i input to the position adjuster 10 may be adjusted in a position thereof and may be output (10o) while a parallel state is maintained. That is, unlike in the case in which the position of a laser beam is adjusted using a rotatably driven mirror, the pointing angle of the laser beam may not be changed and only the position of the laser beam may be adjusted. Thus, a beam delivery apparatus may not require a separate element for limiting and/or preventing cross-talk. The position adjuster 10 including a refraction plate may adjust only a position without influence on the pointing angle of the laser beam.

Figure 9A:
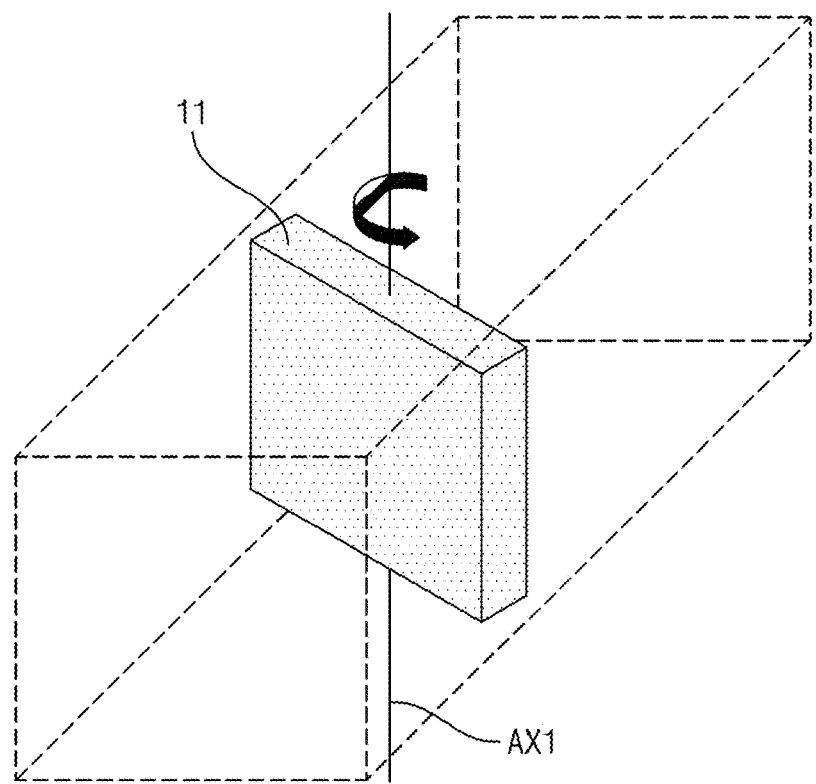
Figure 9B:
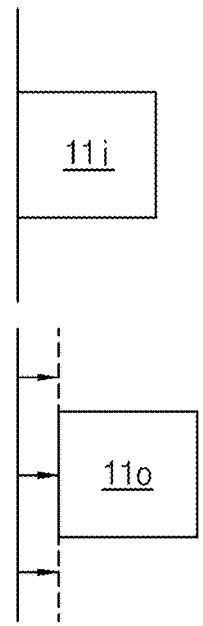

Referring to FIG. 9A, the first refraction plate 11 may revolve around the first adjustment axis AX1 perpendicular to a horizontal plane. In this case, referring to FIG. 9B, a laser beam 11o formed by horizontally moving a laser beam 11i input to the first refraction plate 11 in parallel may be output.

Figure 10A:
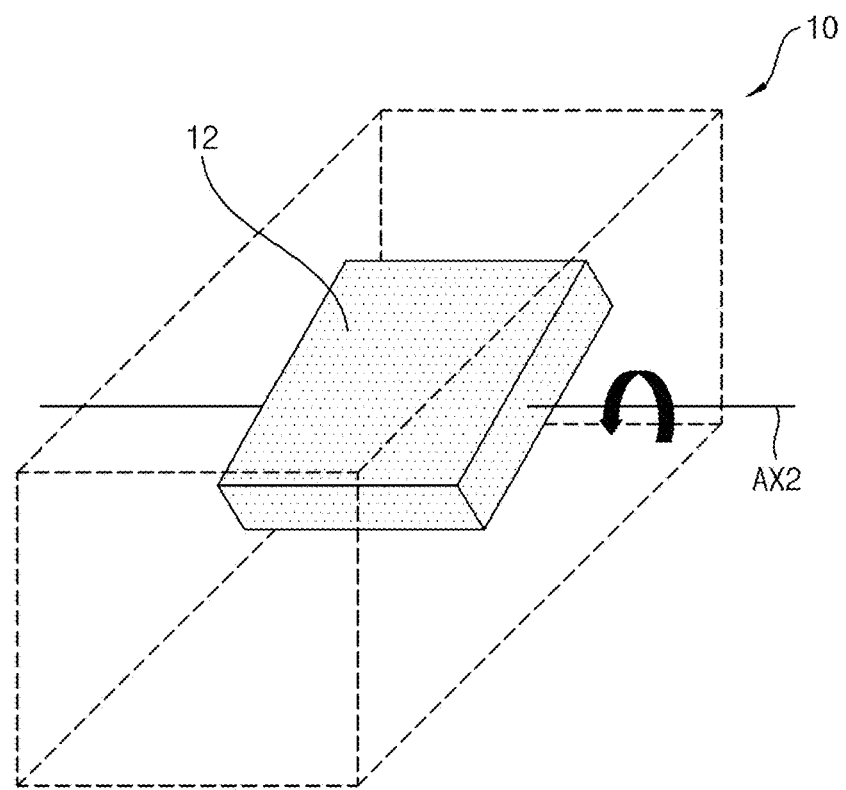
Figure 10B:
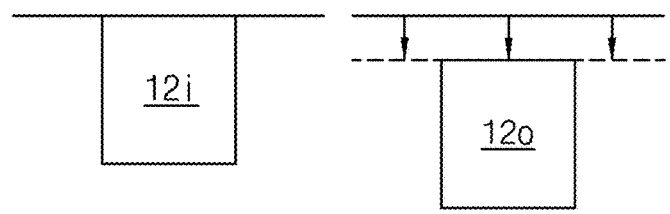

Referring to FIG. 10A, the second refraction plate 12 may be positioned in parallel to the horizontal plane and may revolve around the second adjustment axis AX2 perpendicular to a path of a laser beam. In this case, referring to FIG. 10B, a laser beam 12o formed by perpendicularly moving a laser beam 12i input to the second refraction plate 12 in parallel may be output.

Figure 11:
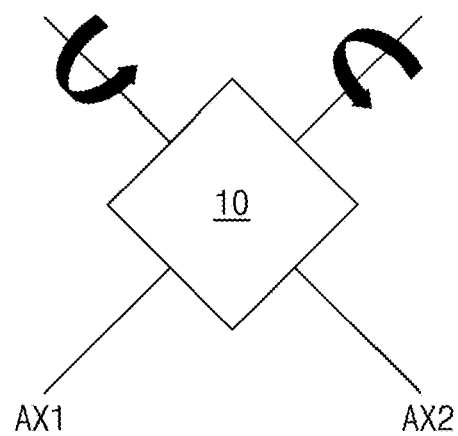

Referring to FIG. 11, the position adjuster 10 may include the first adjustment axis AX1 and the second adjustment axis AX2 that cross each other. According to an embodiment, the first adjustment axis AX1 and the second adjustment axis AX2 may be orthogonal to each other. According to an embodiment, the position adjuster 10 may include a single refraction plate instead of a plurality of refraction plates and may revolve around the single refraction plate as a central point to adjust the position of a laser beam.

According to an embodiment, the refraction plate may include the first refraction plate 11 and the second refraction plate 12, and another component of the laser beam delivery apparatus 1 may be disposed between the first refraction plate 11 and the second refraction plate 12. For example, the first refraction plate 11 may be disposed between the first power amplifier (PA0) 210 and the second power amplifier (PA1) 220, and the second refraction plate 12 may be disposed between the second power amplifier (PA1) 220 and the third power amplifier (PA2) 230. In this case, the second power amplifier (PA1) 220 may be disposed between the first refraction plate 11 and the second refraction plate 12.

The refraction plate may further include a third refraction plate. The third refraction plate may revolve around the third adjustment axis that cross the first adjustment axis AX1 and the second adjustment axis AX2. That is, the refraction plate may include two or more refraction plates. Revolution axes of each of the refraction plates may not be positioned in parallel to each other.

Figure 12:
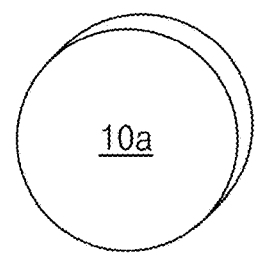

The refraction plate may include polygonal quartz. Referring to FIG. 12, the refraction plate may also include circular quartz 10a. A shape of the refraction plate is not limited, and the refraction plate may include any shape as long as a surface to which a laser beam is input and a surface from which the laser beam is output are flat.

According to an embodiment of the disclosure, a laser beam delivery apparatus of an extreme ultra violet light source may replace a position adjuster of a laser beam with a plurality of refraction plates. The position of the laser beam may be adjusted by a plurality of refraction plates, and the pointing of the laser beam may be adjusted by a mirror. Cross-talk between mirrors that may occur when both position adjustment and pointing adjustment are performed by a mirror may be removed. The pointing of the laser beam may not be changed through (and/or using) a position adjuster and only the position may be adjusted.

While the embodiments of inventive concepts have been described with reference to the accompanying drawings, it should be understood by those skilled in the art that various modifications may be made without departing from the scope of inventive concepts and without changing features, aspects, and effects thereof. Therefore, the above-described embodiments should be considered in a descriptive sense only and not for purposes of limitation.

What is claimed is:

1. A laser beam delivery apparatus comprising:
   a high power seed module configured to generate a laser beam;
   a power amplifier configured to amplify the laser beam generated by the high power seed module, the power amplifier including a position adjuster configured to adjust a position of the laser beam, the position adjuster including a refraction plate;
   a beam transfer module configured to collect and move the laser beam amplified by the power amplifier;

a final focusing assembly optical platform configured to adjust focus of the laser beam collected and moved by the beam transfer module; and a focusing unit configured to focus the laser beam with the focus adjusted by the final focusing assembly optical platform to a target droplet.

2. The laser beam delivery apparatus of claim 1, wherein the refraction plate comprises polygonal quartz.

3. The laser beam delivery apparatus of claim 1, wherein the refraction plate comprises circular quartz.

4. The laser beam delivery apparatus of claim 1, wherein the power amplifier further comprises:

a first amplifier configured to amplify the laser beam generated by the high power seed module;

a second amplifier configured to amplify the laser beam amplified by the first amplifier;

a third amplifier configured to amplify the laser beam amplified by the second amplifier; and a fourth amplifier configured to amplify the laser beam amplified by the third amplifier.

5. The laser beam delivery apparatus of claim 4, wherein the first amplifier, the second amplifier, the third amplifier, and the fourth amplifier each comprise a first layer and a second layer, the first layer comprises a first amplification mirror, a second amplification mirror, a third amplification mirror, and a fourth amplification mirror, and the second layer comprises a fifth amplification mirror, a sixth amplification mirror, a seventh amplification mirror, and an eight amplification mirror.

6. The laser beam delivery apparatus of claim 4, wherein the position adjuster is between the first amplifier and the second amplifier.

7. The laser beam delivery apparatus of claim 4, wherein the position adjuster is between the second amplifier and the third amplifier.

8. The laser beam delivery apparatus of claim 4, wherein the position adjuster is between the third amplifier and the fourth amplifier.

9. The laser beam delivery apparatus of claim 1, wherein the beam transfer module comprises a pre-beam transfer module and a main beam transfer module;

the pre-beam transfer module is configured to collect a laser beam, and the main beam transfer module is configured to move the laser beam collected by the pre-beam transfer module.

10. The laser beam delivery apparatus of claim 1, wherein the final focusing assembly optical platform comprises a pointing adjuster configured to adjust a pointing angle of a laser beam, and the pointing adjuster comprises a mirror.

11. The laser beam delivery apparatus of claim 1, wherein the refraction plate comprises:

a first refraction plate configured to revolve around a first adjustment axis; and a second refraction plate configured to revolve around a second adjustment axis crossing the first adjustment axis.

12. The laser beam delivery apparatus of claim 11, wherein the first adjustment axis and the second adjustment axis are orthogonal to each other.

13. The laser beam delivery apparatus of claim 11, wherein the power amplifier further comprises a first amplifier, a second amplifier, a third amplifier, and a fourth amplifier which are sequentially arranged in series;

the first refraction plate is between the first amplifier and the second amplifier; and the second refraction plate is between the second amplifier and the third amplifier.

14. The laser beam delivery apparatus of claim 11, wherein the refraction plate further comprises a third refraction plate configured to revolve around a third adjustment axis; and the third adjustment axis crosses the first adjustment axis and the second adjustment axis.

15. A laser beam delivery apparatus comprising:

a high power seed module configured to generate a laser beam;

a power amplifier configured to amplify the laser beam generated by the high power seed module;

a beam transfer module configured to collect and move the laser beam amplified by the power amplifier, the beam transfer module comprises a position adjuster configured to adjust a position of the laser beam, and the position adjuster comprises a refraction plate;

a final focusing assembly optical platform configured to adjust focus of the laser beam collected and moved by the beam transfer module; and a focusing unit configured to focus the laser beam with the focus adjusted by the final focusing assembly optical platform to a target droplet.

16. The laser beam delivery apparatus of claim 15, wherein the final focusing assembly optical platform comprises a pointing adjuster configured to adjust a pointing angle of the laser beam, and wherein the pointing adjuster comprises a mirror.

17. The laser beam delivery apparatus of claim 15, wherein the refraction plate comprises a first refraction plate and a second refraction plate, the first refraction plate is configured to revolve around a first adjustment axis, and the second refraction plate is configured to revolve around a second adjustment axis orthogonal to the first adjustment axis.

18. The laser beam delivery apparatus of claim 15, wherein the beam transfer module comprises a pre-beam transfer module and a main beam transfer module, the pre-beam transfer module is configured to collect the laser beam, the main beam transfer module is configured to move the laser beam collected by the pre-beam transfer module, and the position adjuster is included inside the pre-beam transfer module.

19. The laser beam delivery apparatus of claim 15, wherein the beam transfer module comprises a pre-beam transfer module and a main beam transfer module:

the pre-beam transfer module is configured to collect a laser beam, the main beam transfer module is configured to move the laser beam collected by the pre-beam transfer module, and the position adjuster is included inside the main beam transfer module.

20. A laser beam delivery apparatus comprising:

a high power seed module configured to generate a laser beam;

a power amplifier configured to amplify the laser beam generated by the high power seed module;

a beam transfer module configured to collect and move the laser beam amplified by the power amplifier;

a final focusing assembly optical platform configured to adjust focus of the laser beam collected and moved by the beam transfer module, the final focusing assembly optical platform including a position adjuster and a pointing adjuster, the position adjuster being configured to adjust a position of the laser beam, the position adjuster comprising a refraction plate, the pointing adjuster configured to adjust a pointing angle of the laser beam, and the pointing adjuster comprising a mirror; and a focusing unit configured to focus the laser beam with the focus adjusted by the final focusing assembly optical platform to a target droplet.

* * * * *